Sept. 3, 1963 S. S. RATHBUN, JR 3,102,829
INJECTION DEVICE
Filed April 21, 1961

INVENTOR:—
SHERRILL S. RATHBUN, JR.
BY

ATTORNEYS

United States Patent Office 3,102,829
Patented Sept. 3, 1963

3,102,829
INJECTION DEVICE
Sherrill S. Rathbun, Jr., Mill Valley, Calif., assignor to The Electric Auto-Lite Company, a corporation of Ohio
Filed Apr. 21, 1961, Ser. No. 104,643
2 Claims. (Cl. 118—410)

This invention relates to a method and apparatus used for bonding concrete and more particularly for filling hair-line cracks in concrete.

It is known that cracked concrete and similar construction materials such as stone, bricks or plaster can be repaired by injecting a plastic such as a fluid epoxy resin into the cracks. When the resin hardens, it forms a firm bond with the surrounding material and even concrete is stronger at the repaired joint than the body of the concrete. However, since many such cracks are extremely fine, it is necessary to apply substantial pressure to insure adequate penetration. It has been necessary to do a considerable amount of preparatory work before the crack can be injected in order that sufficient pressure can be developed. One method includes steps of drilling holes in the crack at intervals, grouting pipe fittings in the holes, sealing the remainder of the crack with a resin and then injecting a resin under pressure through the various pipe fittings. Obviously, this is a time consuming, expensive procedure since it involves a considerable amount of effort and the resin of the initial grouting and sealing operations must be allowed to set for a substantial period before injection can begin.

In accordance with the present invention, a device and method are provided which enable equipment to be moved into a job and injection immediately started without any preparatory work whatsoever. Further, the equipment involved is relatively simple and inexpensive and it has been found that by the use of this equipment fully satisfactory results are obtained yet costs are substantially lower than when prior art methods are used.

In the drawings forming part of this application:

Figure 1:
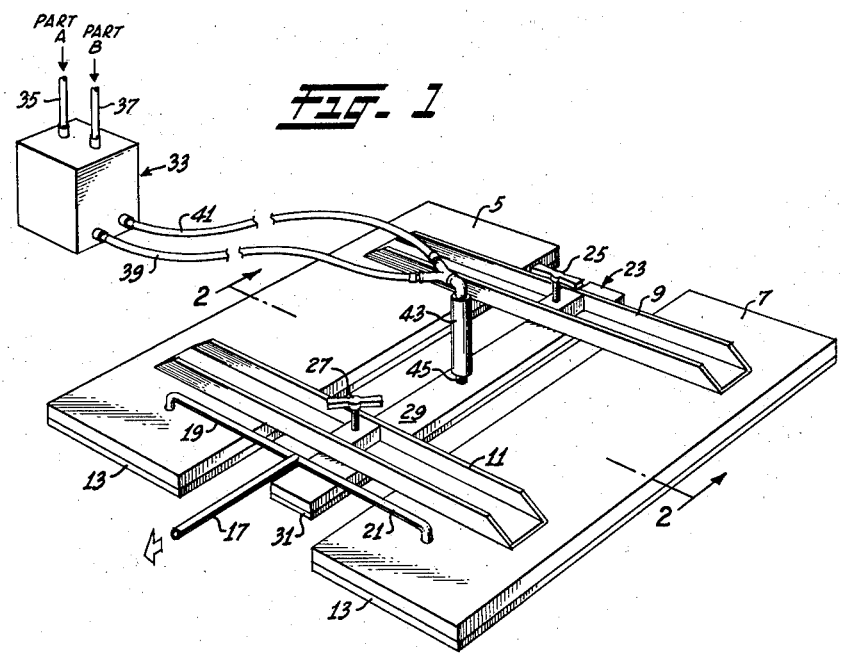
FIGURE 1 is a perspective view of a device embodying the present invention.
Figure 2:
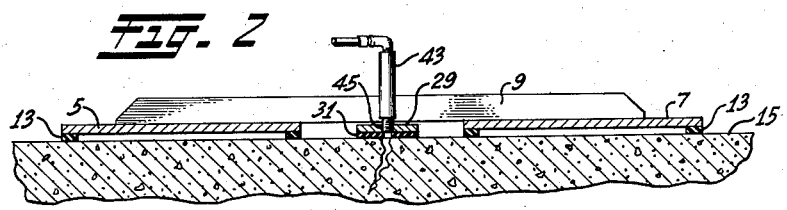
FIGURE 2 is a section on the line 2—2 of FIGURE 1.
Figure 3:
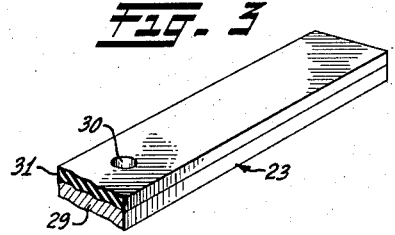
FIGURE 3 is a fragmentary inverted view of the injection element.

Turning now to a description of the drawings by reference characters, there is shown a device having a pair of backing plates 5 and 7 which are connected together by bridging members 9 and 11. Each of the backing plates has a gasket 13 around its periphery, said gasket being made of a relatively resilient substance such as rubber so that a substantially air tight seal can be made by placing the backing plates on a flat surface as at 15. A vacuum line 17 leads to a source of vacuum, not shown, and has branches 19 and 21 leading to the underside of the backing plates 5 and 7, respectively. The bridging members 9 and 11 carry an injection element, generally designated 23, between them. The injection element 23 is adjustable relative to the bridging elements 9 and 11 such as by use of the turn screws 25 and 27 although other adjusting arrangements, such as the use of a toggle, may be employed. The injection element 23 has a backing element 29 with a gasket 31 covering its entire bottom area except for a central hole 30. It will be observed that the area of the backing plate 29 is much less than the area encompassed by the plates 5 and 7. Thus, if the combined area of the plates 5 and 7 is, say, 15 times that of the plate 29, and if a vacuum of ten pounds per square inch is drawn through the line 17, the plate 29 will be held against the surface with a pressure of 150 pounds per square inch so that approximately this pressure can be used for crack injection.

A portioning pump 33 is employed since epoxy resins normally come in two parts, one a resin part and the other a catalyst part which must be mixed just before injection. Thus part A of a two component mixture may be introduced through line 35 while part B is introduced through line 37 whereupon the two components are accurately proportioned, pressurized and introduced through the lines 39 and 41 into a mixing chamber 43 which is connected by means of a fitting 45 to hole 30 in the gasket 31. In this manner, the epoxy resin mixture, under high pressure, can be introduced into a crack in concrete without any prior preparatory work. Of course, the portioning pump can be eliminated if a single component resin is used or if the components are premixed before being pumped.

Of course, the device of the present invention can be made in various sizes both with respect to area of the backing plates and also the area of the injection plate. Since the epoxy resin will follow a substantially fan-shaped pattern in the crack, i.e. the resin will flow laterally at about the same rate of speed that it will flow downward, the length of the backing plate 29 should be at least about twice as long as the particular slab is thick. Under these circumstances, penetration will be obtained completely through the slab by the time resin commences to flow from the ends of the crack not encompassed by the backing plate 29.

In use the device is placed over a crack and the resin mixture injected until material starts to ooze out at the ends of the plate 29. The device is then moved for a distance along the crack equal to about half of the length of the plate 29 whereupon the operation is repeated and so on.

This invention is not predicated upon the use of any particular resin composition and the following is only a typical example of one of the many resin mixtures which might be used.

| Part A | Pts./wt. | Part B | Pts./wt. |
| --- | --- | --- | --- |
| Epon 815 | 100 | Thiokol LP-3 | 50 |
|  |  | DMP-30 | 10 |

Epon 815 is a liquid epoxy resin (reaction product of epichlorohydrin and bisphenol-A) in which the epoxide equivalent value is not greater than about 290. Thiokol LP-3 is a liquid polymer which is essentially a difunctional mercaptan made from 98 mole percent of bis(2-chloroethyl) formal and 2 mole percent of trichloropropane, a crosslinking agent. The average molecular weight is 1000. DMP-30 is tris(dimethylamino methyl) phenol.

In some instances the member 29 can be replaced with a holder which serves to hold a small injection head such as is disclosed in my co-pending application Serial No. 56,939, filed September 19, 1960.

I claim:
1. A device for injecting a resin into a crack in a flat surface comprising in combination:
   (a) a first chamber having a gasket around the marginal edges thereof;
   (b) means for drawing a vacuum in said first chamber whereby said chamber can be held by external air pressure against a flat surface;
   (c) a second chamber having a gasket around the marginal edges thereof;
   (d) means for injecting a resin into said second chamber;
   (e) means for extending between said first and second chambers whereby said chambers are held in side-by-side relationship with the gaskets thereof forming a common plane; and

(f) the area defined by the gasket of the first chamber being substantially larger than the area defined by the gasket of the second chamber.

2. A device for injecting a resin into a crack in a flat surface comprising in combination:
 (a) a pair of laterally spaced vacuum chambers, each of said chambers having a gasket around the marginal edges thereof;
 (b) means for drawing a vacuum in said vacuum chambers whereby said chambers can be held by external air pressure against a substantially flat surface;
 (c) an injection chamber having a gasket around the marginal edges thereof;
 (d) means for holding said chambers in side-by-side relationship with the injection chamber between the vacuum chambers with the gaskets of all of the chambers in substantially planar alignment;
 (e) means for injecting a resin into said injection chamber;
 (f) the area defined by the gasket of the vacuum chambers being substantially larger than the area defined by the injection chamber.

References Cited in the file of this patent

UNITED STATES PATENTS

| | | |
|---|---|---|
| 2,070,953 | Morgan | Feb. 16, 1937 |
| 2,214,219 | Barrett | Sept. 10, 1940 |
| 2,346,879 | Turzillo | Apr. 18, 1944 |
| 2,474,567 | Applegate | June 28, 1949 |
| 2,934,452 | Sternberg | Apr. 26, 1960 |